Dec. 6, 1966  A. M. GILDONE  3,289,700

VALVE CONNECTOR

Filed Aug. 10, 1964

INVENTOR
BY ANTHONY M. GILDONE
Watts and Fisher
ATTORNEYS

United States Patent Office 3,289,700
Patented Dec. 6, 1966

3,289,700
VALVE CONNECTOR
Anthony Michael Gildone, 26580 Oriole Ave.,
Euclid, Ohio
Filed Aug. 10, 1964, Ser. No. 388,454
7 Claims. (Cl. 137—614.04)

The present invention relates to fluid control and relates more particularly to fluid valves.

The present invention provides a valve apparatus which permits the connection of two fluid lines while fluid is present in both lines and under pressure. The present apparatus comprises two connector members each having a through fluid passage, and a valve member in the fluid passage. The valve members are each movable between open and closed positions permitting and stopping the flow of fluid through the passages respectively. The valve members are normally resiliently urged to their closed positions when the connector members are apart disconnecting two fluid lines. The valve members include operators which coact to move them to their open positions when the connector members are brought together and secured together to establish a through fluid passage between the fluid lines. As the connector members are brought together, a fluid seal is established in the fluid passage between said valve members prior to movement of the valve members to their open positions so that a fluid tight through passage is always provided.

The valve assembly within each connector member requires an absolute minimum of parts and is facilely assembled. The valve member itself comprises an elongated stem having an enlarged valve head on one end, an operating end surface on the other end, and an annular flange projecting radially from an intermediate portion of the stem and engaging the interior passage surfaces of the connector member for positioning and guiding the valve member during its movement between its open and closed positions. Openings are provided in the flange to permit fluid flow through the flange. A coil spring is interposed between the valve flange and portions of the connector member to normally urge the valve head to its closed position against a valve seat in the connector member passage to prevent the flow of fluid in the passage. The coil spring fits snuggly within the fluid passage and has an inner diameter which is less than the diameter of the passage through the valve seat.

The valve head resembles a frusto-conical flange which projects axially and radially equally and has a frusto-conical outer surface for engaging the valve seat. The frusto-conically shaped valve head has an internal generally conical cavity having its axis co-incident with the axis of the fluid passage. The conical cavity permits the application of full fluid pressure against the surfaces of the valve head perpendicular to the valve seat surface to effect a maximum possible seal.

The valve head further includes an annular camming skirt extending axially from the outermost periphery of the valve head away from the valve seat surface. The camming skirt has an outer frusto-conical surface having its central axis co-incident to the axis of the valve member and defining a cone having its apex pointed directly away from a cone defined by the apex of the frusto-conical seat engaging surface.

The connector members are each assembled by placing a spring around the valve stem between the annular guide flange and the valve head, inserting the valve member into the open end of its connector member with the valve head end first, and forcing the valve head through a constricted fluid passage defined by the portion forming said valve seat. The outer frusto-conical surface of the camming surface engages a camming surface adjacent the valve seat and constricts the valve head radially inward to permit it to pass easily through the valve seat passage. The conical cavity in the valve head permits the valve head to be readily compressed radially inward during assembly of the connector member without permanent deformation of the valve head. Once through the passage, the valve head extends radially outward to its normal position and is urged into engagement with the valve seat surface by the spring.

A particular advantage of the present valve apparatus is that a clear path of fluid flow is provided throughout the entire extent of the through fluid passage in the valve apparatus. The coil spring in its close fitting relation to the valve body surfaces defining the through passage are hidden behind the portions defining the valve seat. In this hidden position the coil spring fills a portion of the passage between the valve seat and the openings in the annular flange and does not provide any obstruction to fluid flow through the valve passage. The clear path of fluid flow through the valve makes it particularly useful for controlling fluid flow of carbonated beverages where agitation of the liquid must be kept at an absolute minimum.

Another advantage of the present valve apparatus is that it requires few parts and all the parts with the possible exception of the coil spring may be made of a suitable synthetic plastic material. The substantially all plastic valve apparatus substantially eliminates the problem of electrolysis, which is especially acute in bulk alcoholic beverage dispensing systems.

No tools are needed for assemblying the valve apparatus. The valve member may be pushed throught the valve seat passage by hand. No modification of the valve stem is necessary to keep the valve member within the valve body as is required with prior valves.

The present valve apparatus as embodied in the double connector member arrangement provides a quick connect-disconnect for connecting fluid lines to containers. It is particularly useful in bulk alcoholic beverage dispensing systems where the bulk beverage is provided in steel kegs. In these installations a connector member is provided with the keg and the other connector member is provided on the supply lines. Connection of the supply line to kegs may be accomplished with fluid under pressure in the keg and with fluid in the lines.

Accordingly, an object of the present invention is to provide a new and improved valve apparatus having minimum restriction in its through fluid passage so as to provide free fluid flow therethrough.

Another object of the present invention is to provide a new and improved valve apparatus which produces a minimum of agitation to and turbulence in the fluid flow in its through passage.

Still another object of the present invention is to provide new and improved connectors which permit the connection of fluid lines when fluid is in the lines and under pressure.

Yet another object of the present invention is to provide valve connectors wherein fluid lines may be connected together under pressure and through fluid passage between the lines is established after the connectors are in a fluid tight relation.

And another object of the present invention is to provide new and improved valve connectors for connecting fluid lines under pressure wherein a fluid tight passage is established and maintained between the connectors whenever valve members within the connectors are in other than fully closed positions.

And still another object of the present invention is to provide new and improved valve connectors wherein a through fluid passage is established through the connectors automatically as they are connected together.

A further object of the present invention is to provide a new and improved valve structure and method of valve manufacture which permits the facile assembly of valve structures.

A still further object of the present invention is to provide a new and improved combination fluid line connector and valve which has few parts and a low cost of manufacture.

Other objects and a fuller understanding of the invention may be had by referring to the following description and claims taken in conjunction with the accompanying drawing in which:

Figure 1:
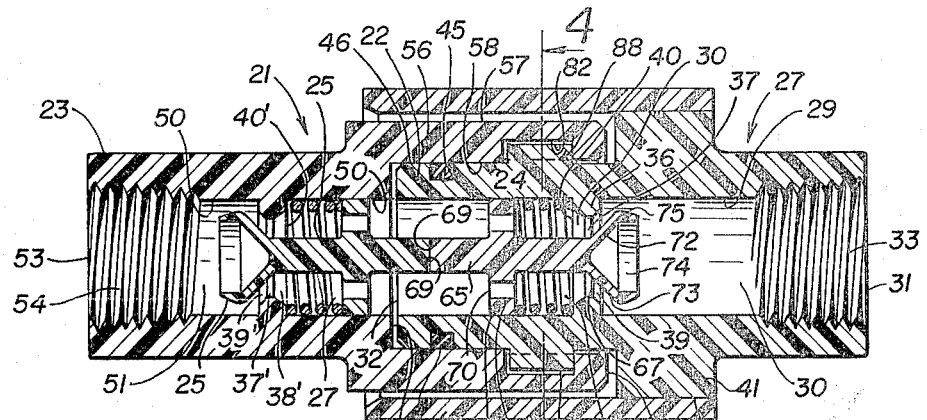
FIGURE 1 is a cross sectional view taken along a longitudinal plane of the valve apparatus of the present invention.
Figure 2:
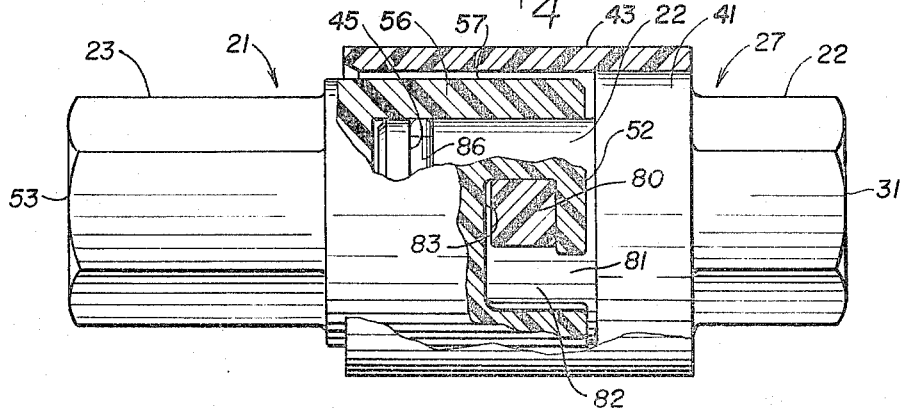
FIGURE 2 is a plan view with parts broken away of the valve apparatus of FIGURE 1.
Figure 3:
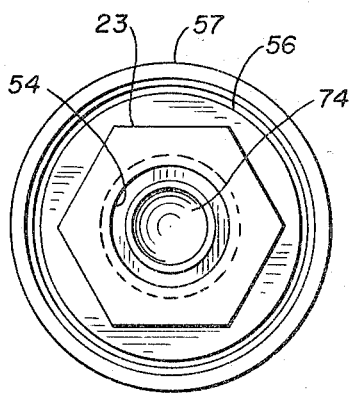
FIGURE 3 is an end view of the valve apparatus of FIGURE 3.
Figure 4:
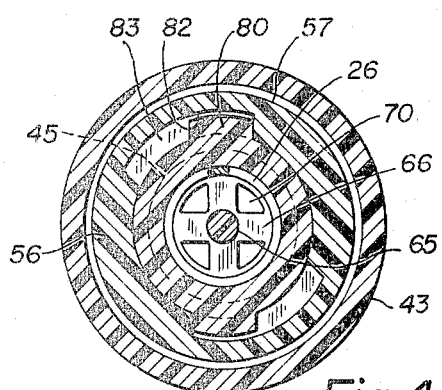
FIGURE 4 is a cross-sectional view taken along line 4—4 of FIGURE 1.

Referring now to the drawing, the present valve apparatus is shown as embodied in a fluid line connector which is designated generally by the reference character 21. The fluid line connector 21 includes male and female connector members 22, 23 respectively, closure valve members 24, 25 and coil springs 26, 27 in each of the connector members 22, 23 respectively. The connector members 22, 23 each are a valve body for their respective valve members 24, 25.

The male connector member 22 has interior surfaces 29 defining a through fluid passage 30 extending axially through its longitudinal center and between its end surfaces 31, 32. A portion 33 of the interior surfaces of the connector member 22 adjacent the end surface 31 is threaded for connection to a fluid line. The fluid passage 30 is substantially cylindrical throughout its longitudinal extent between the end surfaces 31, 32 except for the threaded portion 33 which tapers outward slightly to facilitate threading of the connector member onto the end of a fluid line or other fluid fitting.

An annular valve seat forming portion 36 projects radially inward from the cylindrical wall surfaces of the fluid passage 30 and has an inner cylindrical surface 37, a tapered camming surface 38, a tapered valve seat surface 39, and a shoulder surface 40. The cylindrical surface 37 defines a constricted valve seat passage through the central portion of the connector member. The cam surface 38 and the valve seat 39 are both frustoconical and are disposed one on each side of the cylindrical surface 37. The cam surface 38 faces toward the end 32 which is the connection end of the connector member. The valve seat surface 39 faces toward the fluid line end 31. The shoulder surface 40 faces toward the connection end 32.

An annular shoulder portion 41 projects radially from the outer surface of the connector member 22. The shoulder portion 41 has an outer cylindrical surface 42 which extends in parallel concentric relation to the inner surfaces 29 defining the fluid passage 30. A protective sleeve 43 is fitted tightly onto the cylindrical surface 42 and extends in concentric relation to the passage 30 from the shoulder 41 to beyond the connection end surface 32. The connector member 22 further includes an O-ring receiving recess 45 in an outer cylindrical surface 46 adjacent the end surface 32.

The female connector member 23 has an inner annular surface 50 defining a fluid passage 51 extending axially through the connector member from a connection end surface 52 to a fluid line end surface 53. The inner annular surface 50 is tapered and threaded at an end portion 54 to provide facile threading onto the end of a fluid line. The remainder of the inner annular surface 50 is cylindrical between the threaded end portion 54 and the connection end surface 52.

The connector member 23 further includes an enlarged tubular portion 56 having an outer cylindrical surface 57 and an inner cylindrical surface 58. A shoulder surface 59 is formed between the inner cylindrical surfaces 50, 58. The enlarged tubular portion 56 is sized and adapted to telescope closely onto the connection end of the connector member 22 and within the protective sleeve 43 in spaced relation to the sleeve.

A valve seat forming portion 36' projects radially inward from the interior surface 50 and is identical to the valve seat forming portion 36' of the connector member 22. The valve seat forming portion 36' includes a frustoconical camming surface 38' facing generally toward the connection end surface 52, a frusto-conical valve seat surface 39' facing generally toward the threaded fluid line end 53 of the connector member 23, an intermediate cylindrical surface 37', and a shoulder surface 40' facing toward the connection end 52.

The closure valve members 24, 25 are identical and each includes a central stem portion 65, an annular flange portion 66, and a valve head portion 67. The central stem portion is an elongated solid member having a substantially cylindrical outer surface 68 and an operating end surface 69. The annular flange portion 66 extends radially from the central stem portion 65 intermediate between the valve head portion 67 and the operating end surface 69. The outer surface of the annular flange portion 66 is cylindrical and is sized to telescope within the passage 30, 51. The annular flange portions 66 include apertures 70 for providing fluid passage through the annular flange. The valve head portion 67 includes a frusto-conical flange 72 extending away from the stem portion and an annular camming skirt 74 extending axially from the outer periphery of the flange 72. The valve head portion 67 is a rather uniformly thin member and is resilient and constrictable.

An outer surface 73 of the frusto-conical flange 72 is positioned to engage the valve seat 39 and tapers at about a 45° angle to the central axis of the stem member which is also the angle of the valve seats 39, 39'. The outer surface 75 of the camming skirt 74 tapers slightly relative to the axis of the stem portion to provide a frusto-conical camming surface of good mechanical advantage. An angle of 22° has been found to work satisfactorily.

In the assembled connector members 22, 23 the coil springs 26, 27 fit closely within the passages 30, 51. The outer diameters of the coil springs are substantially the inner diameter of the passages 30, 51. The springs 26, 27 abut the shoulders 40, 40' and outer peripheral portions of the annular flanges 66 radially beyond the openings 70. The inner diameters of the coil springs 26, 27 are less than the diameters of the passages defined by cylindrical surfaces 37, 37', and are substantially less than a circle defined by the outermost points of openings 70 in the flange 66. The springs are well out of the path of fluid flow through the connector members and do not obstruct or restrict free fluid flow. The springs 26, 27 effectively fill the recess between the valve seat passage and the fluid passage provided by openings 70 and lessen chance for turbulence in the flowing fluid.

The connector members 22, 23 are assembled by inserting the valve members 24, 25 into the connection ends 32, 52 of the connector members with the valve head portions 67 first. Springs 25, 26 are placed around the stem portions 65 between the flange 66 and the valve head portions 67 preferably prior to inserting the valve members into the connector members. The springs 26, 27 are then interposed between the shoulder surfaces 40, 40' of the valve seat forming portions 26, 26' and the radial flanges 66 as the closure valve members are moved longitudinally through the through passages 30, 51 toward the threaded end portions 33, 54 so as to compress the springs 26, 27 as the camming surfaces 75, of the valve head portions engage the camming surfaces 38, 38' of the valve seat forming portion. To fully assemble the valve members, they must be forced toward the fluid line end surfaces 31, 53 with sufficient pressure such that the camming surfaces 38 force the valve head portions 67 to constrict radially inward so as to reduce their diameter sufficiently to permit them to pass through the valve seat passages defined by the cylindrical surfaces 37, 37'. Once through the valve seat passages defined by the cylindrical surfaces 37, 37', the valve head portions extend back to their original untensed positions defining an outer diameter substantially larger than the inner diameter of the passages defined by the cylindrical surfaces 37, 37'. When the valve members 24, 25 are released, the valve seat engaging surfaces 73 mate with the valve seat surfaces 39, 39' and are resiliently held in a fluid sealing relation by the springs 26, 27.

When the connector members 21, 22 are separated and the springs 26, 27 urge the valve heads against the valve seat surfaces in a fluid sealing relation, the valve stem operating end surface 69 of the valve member 24 is disposed substantially adjacent or near the end surface 32. The abutment end surface 69 of the valve member 25 extends well beyond the end surface 52 when the valve member 25 is in this closed position.

The connector members are joined to form a through fluid passage between two connected fluid lines or fittings by telescoping the tubular male connector member 22 into the female connector member 23. As the two connector members telescope, projections 80 protruding radially from opposite sides of the cylindrical outer surface of the connector member 22 must enter into an entrance opening 81 of a projection receiving groove 82 in the inner surface of the connector member 23. The connector members 22, 23 are moved longitudinally together until the end surfaces 32, 52 are nearly in abutment. The connector members 22, 23 are then rotated relatively to cause the projections 80 to move into locking portions 83 of the projection receiving grooves 82. In this locked position, the operating end surfaces 69 of the valve members 24, 25 are in abutment, the springs 26, 27 are further compressed, and the valve head portions 67 are spaced from the valve seat surfaces 39, 39' thereby providing fluid communication throughout the fluid passages 30, 51 of both connector members 22, 23. As shown by the drawing, the distance between the valve seat forming portions 36, 36' is substantially less than the total distance between the valve seat surface engaging surfaces 73 of the valve members 24, 25 when the operating end surfaces are in abutment and the connector members are locked together. With the connector members 22, 23 connected in their end connected relation as shown by the drawing, the fluid passages 30, 51 are in axial alignment and provide a through continuous passage throughout the entire connector 21.

The protective sleeve 43 extends longitudinally around the enlarged cylindrical portion 56 of the connector member 23 and prevents dirt from accumulating around the telescoped ends of the connector 21 and entering between the connector members 22, 23.

An O-ring 86 is provided in the recess 45 and engages the inner cylindrical surface 58 of the connector member 23 to provide a fluid tight seal between the fluid passages and the outer atmosphere. The O-ring receiving recess 45 is located adjacent the end surface 32. As the connector members are brought together with their passages aligned, the O-ring 86 establishes a fluid seal between the connector members 22, 23 prior to abutment of the operating end surfaces 69. This fluid seal is maintained in all telescoping positions of the connector members wherein the operating end surfaces are in abutment or are nearly abutting.

The valve members are made of a resilient material, preferably a synthetic plastic material such that the valve head portion has sufficient resiliency so as to pass through the passages defined by the cylindrical surfaces 37, 37' without permanent deformation but so as to have sufficient rigidity to perform the fluid sealing function of the valve. The connector members can be made of a number of materials including metal although synthetic plastic materials are preferred to alleviate the problem of electrolysis.

Briefly, the present invention is believed to comprise essentially a valve body having a through passage and portions defining a valve seat within the passage, a valve closure member disposed within the passage and movable between a closed position engaging the valve seat and an open position spaced from the valve body, resilient means interposed between the valve closure member and the valve body to urge the closure member to one of said positions, and the resilient means defining a clear flow passage through the valve body. The invention contemplates making the valve closure member resilient and assembling the valve by inserting the valve closure member into an outlet end of the through passage and constricting it to pass through the valve seat passage against the urging of the resilient means. The invention further contemplates that two of the present valves may be used as fluid connector members wherein each of the closure members including coacting surfaces which engage to move both closure members to one of said portions when the connector members are brought together with their through passages aligned and like passage ends joined.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

1. A valve comprising:
 (a) a valve body constructed with:
  (i) interior surfaces defining a main through-passage,
  (ii) a valve seat in the passage, said valve seat diverging and facing generally toward an inlet end of the main passage,
  (iii) a smaller passage through the valve seat, and
  (iv) a generally peripheral camming surface adjacent the valve seat, said camming surface facing generally in an opposite direction from the valve seat toward an outlet end of the main passage and converging toward the valve seat passage;
 (b) a valve member having a valve head and stem extending from the valve head, said stem extending through the passage of the valve seat;
 (c) the valve head being resiliently constrictable without permanent deformation and constructed:
  (i) of a shape compatible with the passage through the valve seat to seal the passage when in contact with the seat,
  (ii) with an outer peripheral dimension substantially greater than the interior dimension of the passage through the valve seat;
  (iii) with a divergent portion adjacent the stem that diverges in a direction away from the stem to the outer peripheral dimension of the valve head, generally complimentary to the valve seat, and which is adapted to cooperate with the valve seat, and
  (iv) with a terminal portion contiguous with the diverging portion that converges from the outer peripheral dimension to a smaller dimension no greater than the outer dimension of the camming surface;
 (d) guide means carried by the valve stem and positioned in the valve body on the opposite side of the valve seat from the valve head to position the stem and to guide movement of the stem within the valve body; and (e) bias means interposed between the valve body and the guide means for urging the valve member toward the valve seat.

2. The valve of claim 1 wherein the diverging portion of the valve head forms a greater angle to the central axis of the stem member that does the converging portion.

3. The valve of claim 1 wherein the valve head is concave in the direction facing the fluid fitting end of the fluid passage.

4. The valve of claim 1 wherein the valve member has a unitary valve head and stem and wherein the divergent portion adjacent the stem is frusto-conical in shape.

5. A fluid line valve comprising:
 (a) a pair of valve bodies each having a through fluid passage, the valve bodies at a fluid fitting end of said fluid passage being adapted for connection to fluid fittings, said valve bodies at connection ends of their fluid passages having co-acting portions for locking said valve bodies together with said passages in end-to-end, aligned relation;
 (b) each of said valve bodies having an annular flange in the fluid passage defining a restricted passageway, said flange having a surface facing toward the fluid fitting end defining a valve seat and having a portion facing generally in the opposite direction defining a camming surface and a spring retaining surface;
 (c) a pair of valve members, one disposed within each of the fluid passages and each comprising:
  (i) a closure portion having an integral valve seat engaging surface for engaging the valve seat and closing the restricted passageway, said closure portion being disposed between said valve seat surface and said fluid fitting; and
  (ii) a valve stem portion extending axially of the fluid passage from the closure portion toward said connection end through the restricted passageway and terminating in an operating end surface facing toward the connection end;
 (d) guide means carried by each stem portion in sliding relation with the fluid passage to support and maintain the stem portion of the valve member oriented axially of the pasageway and to permit relative movement of the valve member axially of the passage so that the valve seat engaging surface of the closure portion properly engages the valve seat;
 (e) a coil spring in each of said valve bodies having an outer diameter that is substantially equal to the inner diameter of the fluid passage and an inner diameter that is larger than the restricted passageway so as to minimize obstruction to fluid flow through the fluid passage;
 (f) said operating end surfaces of the stem portions being in abutment and the stem portions being in axially co-extensive relation when said valve bodies are placed in passage aligned relation and said co-acting portions engage to lock said valve bodies in said passage aligned relation; and
 (g) the combined length of said stem portions in axially co-extensive relation with their end surfaces in abutment being greater than the combined length of the fluid passage between said valve seat surfaces whereby when both of said valve bodies are connected in their passage-aligned relation, said operating end surfaces abut to move both of said valve members to their open positions.

6. The device of claim 5 wherein one valve body telescopes within the other valve body, and including sealing means carried by one of said valve bodies and engaging the other of said valve bodies when in their telescoping relation to establish a fluid seal between them, and wherein the sealing means is located on said one valve body and is engaged by the other valve body so as to establish the fluid-tight seal prior to abutment of the operating end surfaces as the valve bodies are brought together in their passage aligned relation.

7. The device of claim 5 wherein the closure portion of each valve member is resiliently constrictable without permanent deformation and is shaped with a diverging seat engaging portion and a converging portion engageable with the camming surface when the closure portion is forced through the restricted passageway from a connection end of the fluid passage toward the fluid fitting end.

References Cited by the Examiner
UNITED STATES PATENTS

| | | | |
|---|---|---|---|
| 404,786 | 6/1889 | Hanson | 137—614.04 |
| 2,106,671 | 1/1938 | Watson. | |
| 2,821,356 | 1/1958 | Rand | 251—333 |
| 2,888,034 | 5/1959 | Glegg | 137—512.4 |
| 2,896,977 | 7/1959 | Hansen | 137—614.04 X |
| 2,931,668 | 4/1960 | Baley | 137—614.04 |
| 3,052,261 | 9/1962 | Nyberg | 137—614.04 |
| 3,199,831 | 8/1965 | Sully | 251—149.6 |

M. CARY NELSON, *Primary Examiner.*

HENRY T. KLINKSIEK, *Examiner.*